Mar. 3, 1925.
J. J. MARTIN
ANIMAL TRAP
Filed May 18, 1923
1,528,447
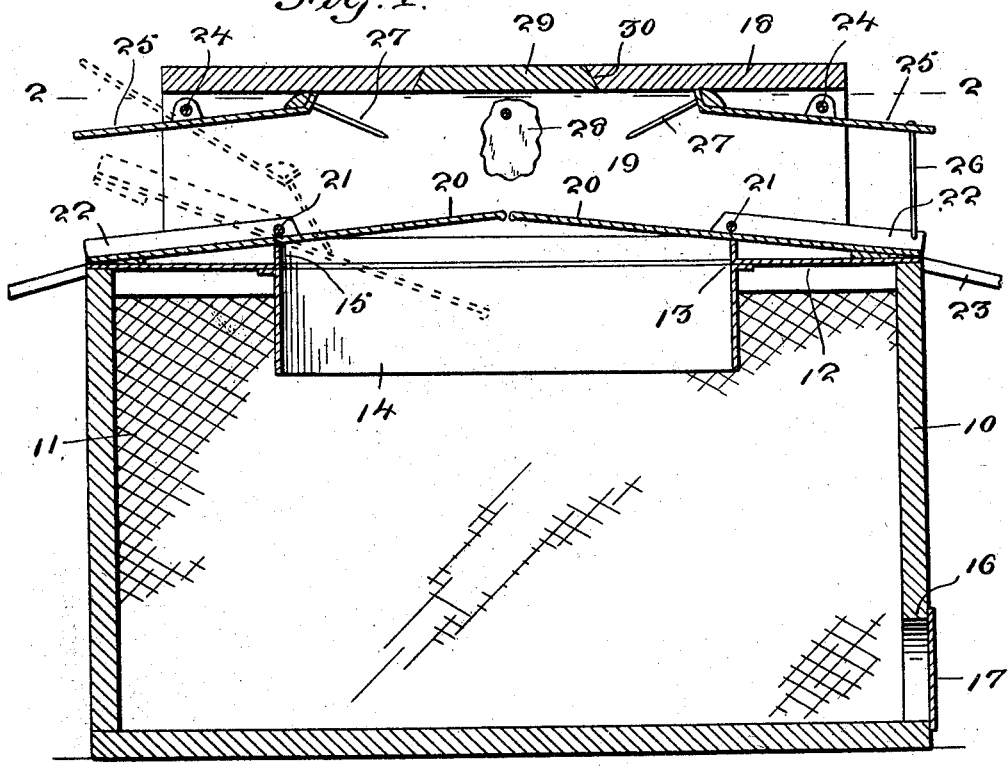
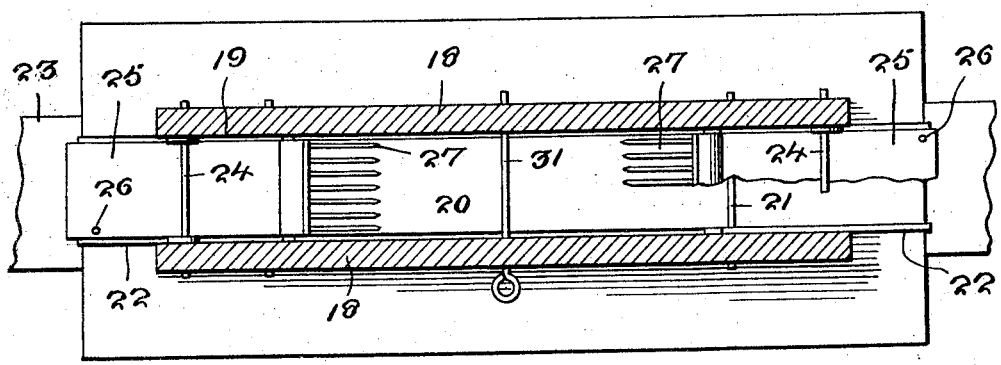
J. J. Martin
INVENTOR
BY Victor J. Evans
ATTORNEY
WITNESS:
E. R. Ruppert.

Patented Mar. 3, 1925.

1,528,447

UNITED STATES PATENT OFFICE.

JOSEPH J. MARTIN, OF NATHALIE, VIRGINIA.

ANIMAL TRAP.

Application filed May 18, 1923. Serial No. 639,923.

*To all whom it may concern:*

Be it known that I, JOSEPH J. MARTIN, a citizen of the United States, residing at Nathalie, in the county of Halifax and State of Virginia, have invented new and useful Improvements in Animal Traps, of which the following is a specification.

This invention relates to improvements in animal traps and has for an object the provision of a trap which is especially adapted for catching rats and mice.

Another object of the invention is the provision of a trap which includes a receptacle normally closed by a pivotally mounted platform or platforms, novel means being provided whereby operation of the platform will operate a barrier to prevent escape of an animal after the platform starts to move.

With the above and other objects in view, the invention further includes the following novel features and details of construction, to be hereinafter more fully described, illustrated in the accompanying drawings and pointed out in the appended claim.

In the drawings:—

Figure 1 is a vertical sectional view of an animal trap constructed in accordance with the invention.

Figure 2 is a section on the line 2—2 of Figure 1.

Referring in detail to the drawings wherein like characters of reference denote corresponding parts, the reference character 10 indicates a casing whose side walls are preferably formed of woven wire as shown at 11 so that the interior of the casing may be readily inspected. The top 12 of the casing is provided with an opening 13, while extending downwardly from this opening within the casing is an apron or chute 14, while a flange 15 extends upwardly from the edges of the opening. The opening 13 provides an entrance opening, while one wall of the receptacle 10 is provided with an outlet opening 16 which is normally closed by a door or closure 17, whereby the trapped animals may be removed.

Mounted upon the top of the receptacle 10 and extending above and beyond the ends of the opening 13 is a housing 18 which is open at each end and which provides a passage 19 for animals entering the trap.

Pivotally mounted within this passage 19 and extending beyond the ends thereof is a pair of platforms 20. These platforms are pivotally mounted as shown at 21 above the ends of the opening 13 and are provided along their outer side edges with flanges 22, so that in addition to providing a bearing for the pivots 21, these flanges increase the weight of the outer ends of the platforms so that these ends will rest upon the top of the casing 10. Inclined runways 23 are provided whereby the animal may reach the platforms.

Pivotally mounted within each end of the passage 19 as shown at 24 is a plate 25. The outer ends of these plates are connected as shown at 26 to the outer ends of the platforms 20, while the inner ends of the plates are provided with spaced fingers 27 which form a barrier when the inner ends of the plates are depressed. A suitable bait 28 is adapted to be placed centrally of the passage 19 and for this purpose there is provided a removable slide 29 which normally closes an opening 30 provided in the top of the passage.

An animal entering the passage 19 at either end will travel over one of the inclined platforms 20 and as soon as he passes the pivotal point 21, the inner end of the platform will begin to tilt downward and the barrier 27 will likewise move downward so as to close the passage behind the animal and prevent his escape. As soon as the inner end of the platform 20 tilts downward sufficiently, the animal will be precipitated into the compartment formed by the casing 10. Should the animal attempt to jump from the tilting platform to the other platform, this last mentioned platform will also tilt downwardly and operate to move its barrier 27 downward in closed position.

The bait 28 may be mounted upon a pin 31.

The invention is susceptible of various changes in its form, proportions and minor details of construction and the right is herein reserved to make such changes as properly fall within the scope of the appended claim.

Having described the invention what is claimed is:—

An animal trap comprising a receptacle having an opening in the top and centrally thereof, a housing open at each end and arranged above the opening to provide a guide passage, a pair of platforms pivotally mounted off center within the passage and having their inner ends arranged to normally close the opening, plates pivotally mounted within the end portions of the passage above the platforms, rods connecting the outer ends of said platforms and plates respectively for simultaneous pivotal movement and the inner weighted ends of said plates carrying barriers thereon and engaging the platform when the latter is tilted.

In testimony whereof I affix my signature.

JOSEPH J. MARTIN.